Patented Nov. 4, 1930

1,780,151

UNITED STATES PATENT OFFICE

FRANZ BECKER, HEINRICH HEIMANN, AND ALFONS BAYERL, OF DESSAU IN ANHALT, GERMANY, ASSIGNORS TO I. G. FARBENINDUSTRIE AKTIENGESELLSCHAFT, OF FRANKFORT-ON-THE-MAIN, GERMANY, A CORPORATION OF GERMANY

PROCESS OF ESTERIFYING CELLULOSE

No Drawing. Application filed December 22, 1928, Serial No. 328,050, and in Germany December 24, 1927.

According to the present invention cellulose esters of valuable properties are obtainable by first treating a cellulose material, for instance, cotton, with nitric acid vapor while preserving the fibrous structure as far as possible, and then further esterifying the product in any desired manner.

The solutions of the cellulose esters thus obtained are remarkably clear and free from fibers. There are obtained without any difficulty solutions of low viscosity, such as are required for many technical purposes, for instance for the manufacture of films and lacquers. Also the products made from these solutions, such as films, threads and plastic masses, are remarkable for their excellent qualities.

The action of nitric acid vapor upon the cellulose, with or without application of a reduced pressure, leads to different degrees of nitration, varying according to the concentration of the acid used, according to the degree to which the vapor is diluted with air or other gas, and according to the duration of the treatment and the temperature applied. Besides, a secondary reaction can be observed consisting in a certain oxidation of the cellulose molecule, more or less marked according to the duration and temperature of the treatment.

The cellulose pre-treated with nitric acid vapor can, for instance, be further nitrated at a low temperature. In this manner the over-oxidation which easily occurs during the centrifuging of the mixed acid when nitration has been conducted at a high temperature, is ovbiated and a nitrocellulose yielding solutions of low viscosity can be obtained. This pre-treatment with nitric acid vapor and after-treatment with mixed acid according to the invention lead with certainty to a uniform nitrocellulose of technically valuable properties.

The use of nitric acid vapor for treating cellulose has the advantage over the known use of liquid acid that only small quantities of nitric acid are required for thoroughly penetrating the cellulose and that the excess of acid can easly and entirely be recovered. Furthermore, the tedious washing and drying can in some cases be dispensed with, because the cellulose derivative still containing a small quantity of free nitric acid can immediately be worked up. The invention also facilitates the production of cellulose esters the solutions of which are of a very low viscosity.

The following examples illustrate the invention:—

*Example 1.*—Air-dry cotton is treated for 1 hour at 50° C. with air which has been saturated with nitric acid vapor by passage at 25° C. through nitric acid of a high percentage strength (96–100 per cent.). The excess of nitric acid is expelled and recovered from the fibrous mass by means of fresh air. The mass which is nearly free from acid is washed with water and dried. Its content of nitrogen amounts to 2–3 per cent.

100 parts by weight of the cotton which has thus been treated and contains 2.7 per cent. of nitrogen are introduced at 10° C. into a mixture of 400 parts of glacial acetic acid, 300 parts of acetic anhydride and 2.5 parts of sulfuric acid of 95 per cent. strength. The temperature rises to about 30° C. within 20 minutes. At 30° C. the mass is dissolved completely after 2 hours. After addition of dilute aqueous sulfuric acid the ester which has formed is hydrolyzed in known manner until the desired solubility in acetone or the like is attained. The solution of the nitro-acetyl cellulose thus obtained is clear and easily flowing and gives excellent water-proof films and lacquers.

*Example 2.*—100 parts by weight of cotton which have been pre-treated with nitric acid vapor as described in Example 1 while preserving the fibrous structure as far as possible and contains 1.9 per cent. of nitrogen, are treated with 5000 parts of mixed acid (for instance, containing: 41.8% H$_2$SO$_4$, 39.8% HNO$_3$, 18.4% H$_2$O) for 1 hour at 40° C., then washed with water, stabilized and dried at a low temperature. There are obtained about 140 parts of a nitrocellulose containing about 11.4 per cent. of nitrogen. Solutions of about 15–20 per cent. strength of this ester in acetone, in a mixture of ether and alcohol and in methanol are clear, readily flowing and easily worked up into films. If a somewhat higher temperature is applied during the nitrating operation, solutions are obtained which are even less viscous and are very suitable for making lacquers.

*Example 3.*—100 parts by weight of cotton are treated with nitric acid vapor as described in Example 1 while preserving the fibrous structure as far as possible; the excess nitric acid vapor is expelled by air and the cellulose thus pre-treated is then treated directly, that is to say without previously washing it, with mixed acid as described in Example 2. The result is analogous to that of the preceding example.

We claim:—

1. A process of producing cellulose esters which comprises treating a cellulose material with nitric acid vapor and reacting on the so pre-treated material with any esterifying agent.

2. A process of producing cellulose esters which comprises treating a cellulose material with nitric acid vapor diluted by a gas and reacting on the so pre-treated material with any esterifying agent.

3. A process of producing cellulose esters which comprises treating a cellulose material with nitric acid vapor diluted by air and reacting on the so pre-treated material with any esterifying agent.

4. A process of producing cellulose esters which comprises treating a cellulose material with air charged with nitric acid vapor at a moderately raised temperature and reacting on the so pre-treated material with any esterifying agent.

5. A process of producing cellulose esters which comprises treating a cellulose material with nitric acid vapor and reacting on the so pre-treated material with any esterifying agent in the presence of a catalyst.

6. A process of producing cellulose esters which comprises treating cotton with nitric acid vapor and reacting on the so pre-treated material with any esterifying agent.

7. A process of producing cellulose esters which comprises treating a cellulose material with nitric acid vapor, expelling the excess of nitric acid vapor and reacting on the so pre-treated material with any esterifying agent.

8. A process of producing cellulose esters which comprises treating a cellulose material with nitric acid vapor diluted by a gas and treating the pre-treated material with an esterifying agent comprising acetic anhydride.

9. A process of producing cellulose esters which comprises treating cotton with nitric acid vapor diluted by air and reacting on the pre-treated cotton with an esterifying agent comprising acetic anhydride.

10. A process of producing cellulose esters which comprises treating cotton at a moderately raised temperature with air charged with nitric acid vapor, expelling the excess of nitric acid vapor and reacting on the so pre-treated cotton with an esterifying agent comprising acetic anhydride.

11. A process of producing cellulose esters which comprises treating cotton at a moderately raised temperature with air charged with nitric acid vapor, expelling the excess of nitric acid vapor and reacting on the so pre-treated cotton with an esterifying agent comprising acetic anhydride in the presence of acetic acid and sulfuric acid.

In testimony whereof, we affix our signatures.

FRANZ BECKER.
HEINRICH HEIMANN.
ALFONS BAYERL.